(No Model.) 3 Sheets—Sheet 1.
R. T. PRESTON & J. HOLDEN.
STAY FOR BOILERS.
No. 562,025. Patented June 16, 1896.
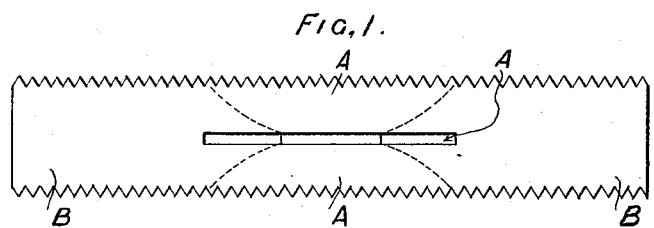
Fig. 1.
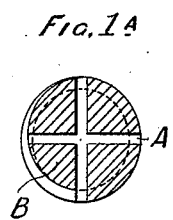
Fig. 1.A
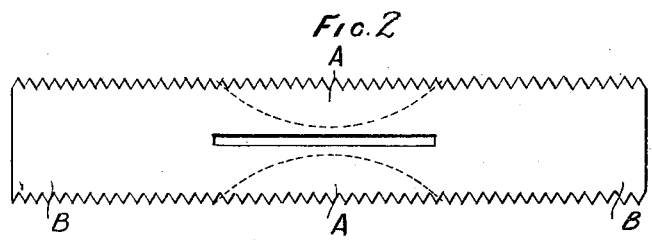
Fig. 2.
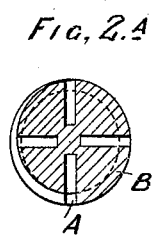
Fig. 2.A
Witnesses:
B. S. Ober
Henry Otto
Inventors,
Reuben Thomas Preston,
James Holden.
by Henry Otto
Atty.

(No Model.) 3 Sheets—Sheet 2.

R. T. PRESTON & J. HOLDEN.
STAY FOR BOILERS.

No. 562,025. Patented June 16, 1896.

Witnesses
Inventors
Reuben Thomas Preston
James Holden
by Henry Orth
Atty.

(No Model.) 3 Sheets—Sheet 3.
R. T. PRESTON & J. HOLDEN.
STAY FOR BOILERS.

No. 562,025. Patented June 16, 1896.

Witnesses:

Inventors:
Reuben Thomas Preston.
James Holden.
by
Atty.

UNITED STATES PATENT OFFICE.

REUBEN THOMAS PRESTON, OF LONDON, AND JAMES HOLDEN, OF WANSTEAD, ENGLAND.

STAY FOR BOILERS.

SPECIFICATION forming part of Letters Patent No. 562,025, dated June 16, 1896.

Application filed November 7, 1895. Serial No. 568,223. (No model.) Patented in England August 15, 1894, No. 15,547; in France October 22, 1895, No. 251,103, and in Belgium October 22, 1895, No. 118,023.

*To all whom it may concern:*

Be it known that we, REUBEN THOMAS PRESTON, residing at Deptford, London, and JAMES HOLDEN, residing at Wanstead, England, subjects of the Queen of Great Britain, have invented new and useful Improved Stays for Steam-Boilers and other Vessels, (for which Letters Patent have been obtained in Great Britain, dated August 15, 1894, No. 15,547; in France, dated October 22, 1895, No. 251,103, and in Belgium, dated October 22, 1895, No. 118,023,) of which the following is a specification.

Our invention has relation to stays for steam-boilers and other vessels; and it has for its object to avoid or materially reduce the liability to fracture and consequent need of replacing, which obtains with the existing forms of stays. This object we attain by so constructing the stays as to render that portion thereof intermediate of their screw-threaded ends, or intermediate of the plates to be stayed, more or less flexible, thereby imparting to the stays greater strength, and consequently greater power of resisting the racking strains caused by unequal and varying expansion and contraction of the plates to be stayed. This we accomplish by dividing up the body of the stay between their screw-threaded ends or heads or between the plates to be stayed by splitting or socketing said body of the stay, as will now be fully described, reference being had to the accompanying drawings, in which—

Figure 9:
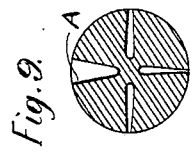
Figure 8:
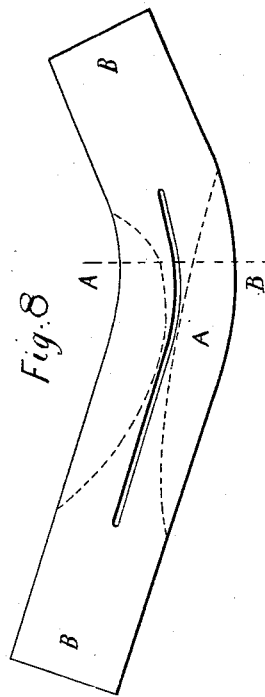
Figure 10:
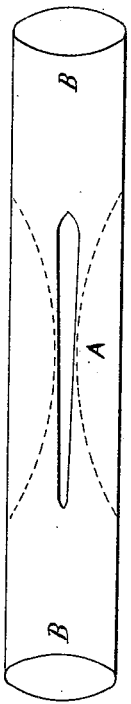
Figure 11:
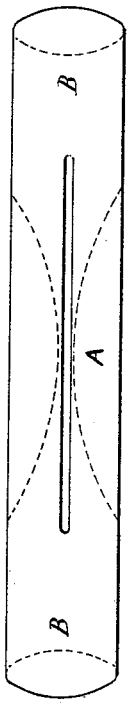

Figures 1 to 8 and 10 and 11 show by side views different forms of stays embodying our invention. Figs. $1^a$ to $7^a$ are cross-sections of Figs. 1 to 7, respectively; and Fig. 9 is a like view of the stay shown in Fig. 8.

In carrying out our invention a solid bar of a suitable metal, as Stone's bronze or steel, has that portion between the plates to be stayed divided up into coherent sections, which latter are of so small a cross-sectional area as to impart to said portion of the bar the desired flexibility, while the combined cross-sectional area is such as to resist the tensile strain as well as the racking or binding strain to which they are subjected. The dividing up into sections may be carried out merely in a portion or throughout the whole length of the aforementioned intermediate portion of the stay, and this may be effected in various ways. For instance, the stay shown in Figs. 1 and $1^a$ is cut through in the middle of the intermediate portion A in two directions at right angles to each other, so as to result in four sector-like parts. This may be done by milling, sawing, or otherwise, the ends B of the bar being left solid.

In the stay shown in Figs. 2 and $2^a$ the intermediate portion A is partly cut through, so as to form radial recesses, thus leaving a solid central or axial core. The dividing up of the body A of the stay may be effected by cutting through on lines at an angle to the longitudinal axis to form four sector-like sections, as shown in Figs. 3 and $3^a$, or to form sections connected by a central solid core, as shown in Figs. 4 and $4^a$, the construction of stay Figs. 3 $3^a$ and 4 $4^a$ being similar to that shown in Figs. 1 $1^a$ and 2 $2^a$, respectively, except that the lines of division are at an angle to the longitudinal axis of the stay, as stated.

Figure 5:
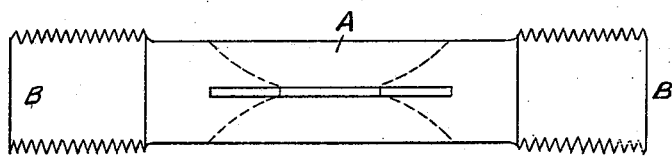
Figure 5A:
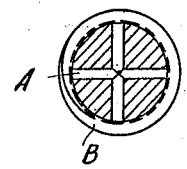

The stay shown in Figs. 5 and $5^a$ is in construction similar to the stay shown in Figs. 1 and $1^a$, with the exception that its screw-threaded ends are of greater diameter than the body A of the stay.

Figure 6:
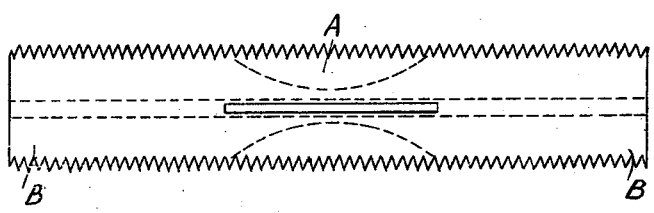
Figure 6A:
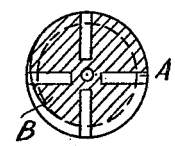

The stay shown in Figs. 6 and $6^a$ differs from the one shown in Figs. 1 and $1^a$ in that the flexibility of the body A is increased by a central longitudinal opening extending throughout the length of the stay, which opening or passage will have to be plugged at one or both ends under some conditions of use, either by riveting over or otherwise.

Figure 3:
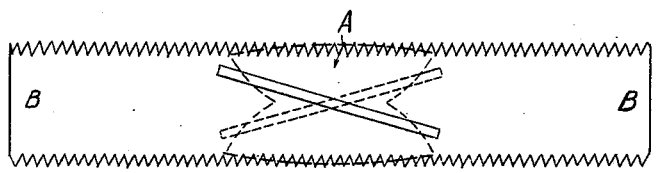
Figure 3A:
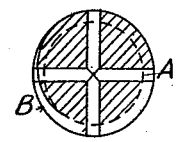
Figure 4:
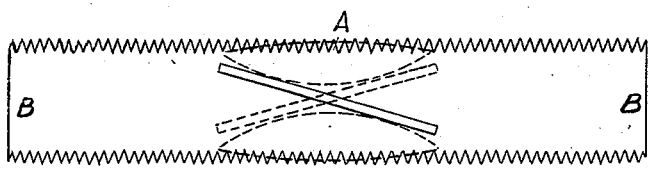
Figure 4A:
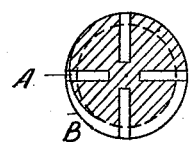
Figure 7:
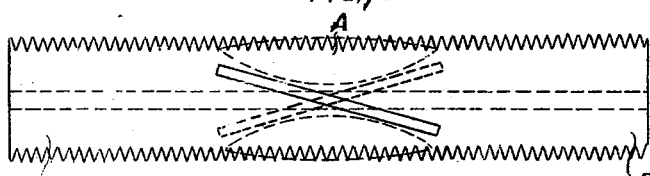
Figure 7A:
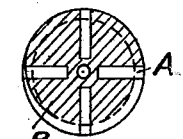

The stay shown in Figs. 7 and $7^a$ in construction is similar to the stay shown in Figs. 6 and $6^a$, except that the lines of division are at an angle to the longitudinal axis of the stay, as in Figs. 3 and 4.

Although we have shown in Figs. 1 to 7 only a middle part of the intermediate portion A provided with recesses or slots, the said recesses or slots may be formed throughout a greater part or through the entire length of said intermediate portion. In the bending which takes place with an ordinary solid boiler-stay, due to the varying degrees of expansion in the stayed plates, destructive molecular movements occur which gradually lessen the strength of the stay till it ultimately gives way. These destructive molecular movements are almost entirely eliminated in our stay, being confined to the region of the neutral axis in the bending movement. It follows that the life of such a stay is necessarily much prolonged.

In Figs. 8 to 11 the bending of the stay shown in Figs. 2 and 2ª is exaggerated to illustrate more clearly how the longitudinal slots, opening in the upper part and closing in the lower part, admit of the various internal movements incident to bending without the destructive disturbances which take place in the ordinary solid stay.

The stays made as described are of special value for the staying of surfaces in locomotive fire-boxes and in marine boilers of the ordinary types and of the more recently introduced water-tube constructions used for torpedo-boats, where the stays are exposed to racking or transverse strains; but the stays may also be used for other steam-boilers and other vessels.

Having thus described our invention, what we claim as new therein, and desire to secure by Letters Patent, is—

1. The improvement in boiler-stays which consists in dividing up the stay into sections in the portion which is intermediate between the plates to be stayed, for the purpose of imparting to such intermediate portion a flexibility suitable for resisting the racking strains caused by unequal and varying expansion and contraction of the plates stayed, substantially as set forth.

2. The improvement in boiler-stays, which consists in dividing up the stay into inter-spaced sections in the portion of the stay which is intermediate between the plates to be stayed, substantially as and for the purpose set forth.

3. A screw-ended boiler-stay, which in the portion intermediate between the plates to be stayed is provided with through-slots which divide this part of the stay into separate bars, substantially as and for the purpose set forth.

REUBEN THOMAS PRESTON.
JAMES HOLDEN.

Witnesses:
GEO. J. B. FRANKLIN,
JOSEPH LAKE.